(12) United States Patent
Topek et al.

(10) Patent No.: US 7,156,126 B2
(45) Date of Patent: Jan. 2, 2007

(54) PIPE INSERT AND PIPE ASSEMBLY FORMED THEREWITH

(76) Inventors: Philip R. Topek, 14011 Grand Heights Ct., Houston, TX (US) 77062; Newell J. Rollins, 568 E. Big Sky Dr., Sandy, UT (US) 84070

( * ) Notice: Subject to any disclaimer, the term of this patent is extended or adjusted under 35 U.S.C. 154(b) by 0 days.

(21) Appl. No.: 10/495,604

(22) PCT Filed: Nov. 14, 2002

(86) PCT No.: PCT/US02/36406

§ 371 (c)(1),
(2), (4) Date: May 14, 2004

(87) PCT Pub. No.: WO03/042588

PCT Pub. Date: May 22, 2003

(65) Prior Publication Data
US 2005/0005986 A1 Jan. 13, 2005

Related U.S. Application Data

(60) Provisional application No. 60/331,311, filed on Nov. 14, 2001.

(51) Int. Cl.
*F16L 9/18* (2006.01)

(52) U.S. Cl. .................... 138/117; 138/114; 138/116; 138/148; 138/112; 138/113; 138/108; 174/135

(58) Field of Classification Search ........ 138/115–117, 138/108, 114, 112, 113, 148; 174/135; 248/49
See application file for complete search history.

(56) References Cited

U.S. PATENT DOCUMENTS

| 360,782 | A | * | 4/1887 | Ober ........................ 138/113 |
| 417,992 | A | * | 12/1889 | Dell ......................... 138/114 |
| 2,998,472 | A | * | 8/1961 | Bondon ..................... 174/28 |
| 3,121,136 | A | * | 2/1964 | Mildner ..................... 174/28 |
| 4,157,194 | A | | 6/1979 | Takahashi ..................... 285/3 |
| 4,705,914 | A | * | 11/1987 | Bondon ..................... 174/28 |
| 4,806,705 | A | * | 2/1989 | Chen ........................ 174/135 |
| 4,836,968 | A | | 6/1989 | Cakmakci ............. 264/177.19 |
| 4,906,496 | A | | 3/1990 | Hosono et al. ............ 428/36.9 |
| 5,210,813 | A | | 5/1993 | Oestreich et al. ........... 385/105 |
| 5,592,975 | A | * | 1/1997 | Wissmann et al. .......... 138/112 |
| 6,116,290 | A | * | 9/2000 | Ohrn et al. ................. 138/149 |
| 6,199,595 | B1 | * | 3/2001 | Baker ....................... 138/149 |
| 6,564,831 | B1 | * | 5/2003 | Sanoner et al. ............. 138/115 |

FOREIGN PATENT DOCUMENTS

EP 1039201 9/2000
FR 773584 11/1934

* cited by examiner

*Primary Examiner*—Patrick F. Brinson
(74) *Attorney, Agent, or Firm*—Crowell & Moring LLP

(57) ABSTRACT

A synthetic resin pipe insert for insertion in an existing pipe or for use in the manufacture of new pipe to form a multi-channel pipe. The insert has a curved cross sectional configuration which defines a segment of a circle with a convexly curved radially outer wall and a concavely curved radially inner wall and a plurality of radial walls extending between the curved, radially inner and outer walls to form at least two linear channels. A curved inner pipe member may optionally be fitted against the concavely curved radially inner wall. The pipe insert of the invention facilitates multiple utility connections, such as cable TV and sewer, in a single pipe assembly.

21 Claims, 3 Drawing Sheets

PIPE INSERT AND PIPE ASSEMBLY FORMED THEREWITH

BACKGROUND OF THE INVENTION

Buildings typically require multiple utility connections. For example, it is usual to have one connection for water supply, another for conveying away sewage, a third for electricity, a fourth for telephone, a fifth for cable television, and a sixth for a heating fuel, such as natural gas. Additional types of connections, such as for dedicated data processing networks, may also be envisioned. It is usual for each connection to be established separately. Moreover, there is an increasing tendency for such connections to be established underground. Not only do underground connections avoid the undesirable aesthetic effects of visible above-ground connections, but they also in many cases are more protected against disturbance due to freezing, falling trees, or other causes.

The installation of separate underground connections for each utility service multiplies the work required as well as requiring extra space so that the connections can be far enough apart that one can be worked on without disturbing the others.

Consideration has also been given to establishment of multiple utility connections within a single pipe. Thus, for example, efforts have been made to feed a fiber optic cable for telephone or cable TV service through a sewer pipe. To date, however, such efforts have not been sufficiently successful to come into widespread use. Examples of prior art multiple-wall pipes are disclosed in U.S. Pat. No. 4,157,194 and U.S. Pat. No. 4,906,496. However, available multi-channel pipelines are cumbersome to manufacture and/or install and may not provide adequate separation and/or shielding between utility services. Also, they are not optimally adapted to retrofitting existing utility connections.

Therefore, there has remained a need for improved multi-channel pipe structures which could facilitate the making of multiple utility connections through a single conduit.

OBJECTS OF THE INVENTION

It is therefore an object of the invention to provide a multi-channel pipe insert which can be easily manufactured and easily installed.

Another object of the invention is to provide a pipe insert which will enable multiple utility connections to be established through multiple channels in a single pipe while maintaining a secure and reliable separation of the utility services.

A further object of the invention is to provide pipe assemblies which can be used to establish multiple utility connections through a single installed member. For example, sewer and fiber optic cable can be installed within a single pipe through multiple channels formed using the pipe inserts and/or pipe assemblies of the invention.

In accordance with a first aspect of the invention, the objects are achieved by providing an elongate, extruded, synthetic resin pipe insert having a curved cross section defining a segment of an annulus with coaxial, radially inner and outer walls and at least three radial walls extending between said radially inner and outer walls to form at least two linear compartments. In a particularly preferred aspect, the annulus is a segment of a circular ring, and said inner and outer walls are configured as smooth curves.

In accordance with a further aspect of the invention, the objects are achieved by providing a pipe assembly comprising an elongate, extruded synthetic resin pipe insert having a curved cross-section defining a segment of a circle with coaxial, curved, radially inner and outer walls and at least three radial walls extending between said curved radially inner and outer walls to form at least two linear compartments, and an additional pipe member having a convexly curved outer wall matching the curvature of and matingly received against the curved radially inner wall.

In yet another aspect of the invention, the objects are achieved by providing a pipe assembly comprising an elongate pipe having a curved inner wall and a synthetic resin pipe insert having a curved cross section defining a segment of an annulus with a radially inner wall and a convexly curved radially, outer wall received against the pipe inner wall. In a particularly preferred aspect, the pipe is a circular pipe and the radially outer wall has a smoothly curved outer configuration matching the curvature of and matingly received against the pipe inner wall.

The pipe inserts and pipe assemblies of the invention have the advantage of enabling two or more utility lines or runs, such as sewer and fiber optic cable or water and fiber optic cable, or any other compatible services to be installed in a single trenching or sonic plowing operation. In addition, the pipe inserts of the invention can be used in rehabilitation of existing pipes where a flexible pipe is pulled through the existing pipeline. The pipe assemblies of the invention can also be utilized as a double containment piping system to conform to environmental regulations for double containment of certain materials.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
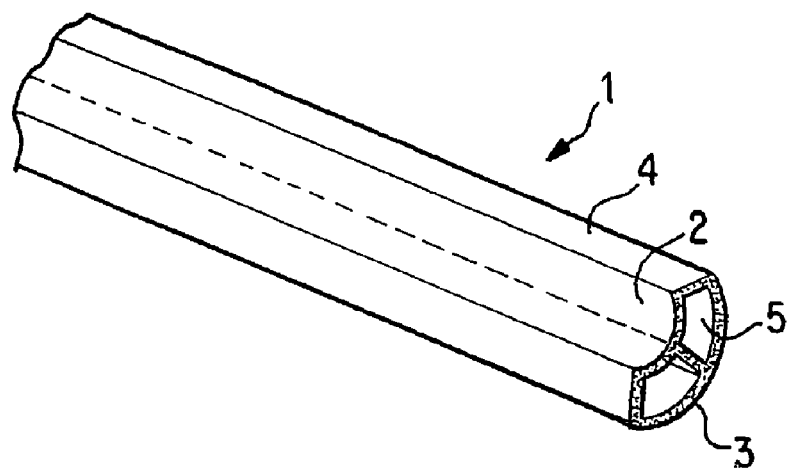
FIG. 1 is a perspective view of a first pipe insert embodiment according to the present invention.

FIG. 1 is a perspective view of a pipe insert according to the invention, generally designated by reference numeral 1, having a curved cross-sectional configuration with concentric radially inner and outer walls 2 and 3 with a plurality of radial walls 4 extending between them to form a plurality of elongated channels 5. The curved cross-sectional configuration preferably forms an arc of about 60° to about 150°. It is particularly preferred to use inserts which form an arc of between about 90° and about 135° as such inserts provide the most advantageous combination of carrying capacity and ease of installation.

The pipe insert may be formed by extrusion from any suitable synthetic resin material. Suitable synthetic resin materials include polyvinyl chloride, chlorinated polyvinyl chloride, high density polyethylene, polypropylene, polyvinylidene fluoride, and acrylonitrile-butadiene-styrene, for example. If desired, the synthetic resin material from which the pipe insert and/or the pipes are made may be reinforced, for example with fiberglass. It may be advantageous to form the pipe insert from the same material as the pipe into which it is to be inserted, but this is not essential.

Figure 3:
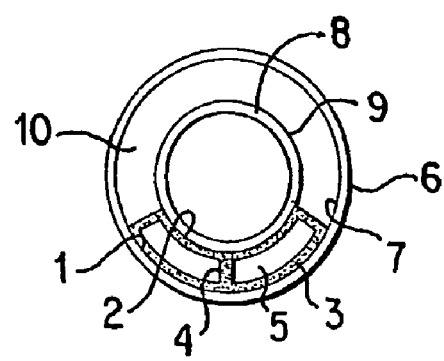
FIG. 3 is a cross-sectional view showing the pipe insert of FIG. 1 incorporated in a pipe assembly between outer and inner pipes.

As can be seen in FIG. 3, pipe insert 1 is inserted within an outer pipe 6. Pipe 6 has a curved inner surface 7 which mates with the convexly curved outer surface 3 of pipe insert 1. If pipe 6 is made of a material which can be fusion welded to the extruded synthetic resin of pipe insert 1, then such welding may be effected by suitable techniques such as extrusion welding or hot air welding.

If desired, an inner pipe 8 having a convexly curved outer surface 9 can be received against the concavely served radially inner surface 2 of pipe insert 1. Again it may be advantageous if inner pipe 8 is formed of the same material as pipe insert 1, but this is not essential. The spacing and arrangement of radial walls 4 in pipe insert 1 stabilize and support the inner pipe 8 so that it will not sag or shift even if longitudinal cavities 5 of insert 1 or the annular space 10 between outer pipe 6 and inner pipe 8 are not filled.

The size and dimensions of the pipe insert and of the outer and inner pipes may vary as needed to provide adequate space and carrying capacity for the particular installation. Wall thicknesses will depend upon the materials being conveyed through the pipe assembly and the applicable regulatory standards applicable to pipes for carrying such materials. The pipe inserts of the invention can be manufactured to fit the dimension of any class, schedule, type, dimension or style of pipe. It is not essential that the pipes have perfectly circular cross-sections, but it is ordinarily desirable as this configuration provides the best combination of carrying capacity and strength for a given amount of material and facilitates handling.

If the surrounding outer pipe 8 is made of metal, the pipe insert 1 may be adhesively attached to the inner surface of the outer pipe, for example with an epoxy resin adhesive. Bonding of the pipe insert to the outer pipe is not essential, however, since the configuration of the pipe insert will naturally assure stable positioning.

When the pipe insert is manufactured from the same material as the outer and/or inner pipes, it can additionally perform the function of a linear pipe restraint. If desired, pipe assemblies according to the invention may be formed with expansion and contraction loops to compensate for variations in length due to changes in temperature.

Sections of pipe inserts and/or pipe assemblies according to the invention can be joined together in end to end relation by suitable butt welding techniques, e.g. fusion welding or solvent welding.

The configuration of the pipe insert and its position at the bottom of the outer and inner pipes leaves open the possibility of lateral branches which connect to outer pipe 6 or inner pipe 8 above the position of pipe insert 1.

It is also possible to provide multiple layers of pipe inserts in a single pipe. Pipe components may also be joined to each other by solvent welding.

Figure 2:
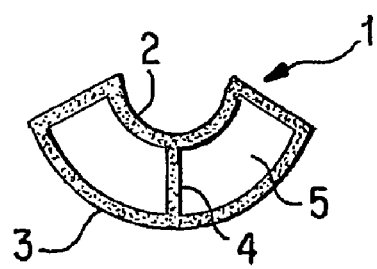
FIG. 2 is a cross-sectional view of the pipe insert of FIG. 1.
Figure 4:
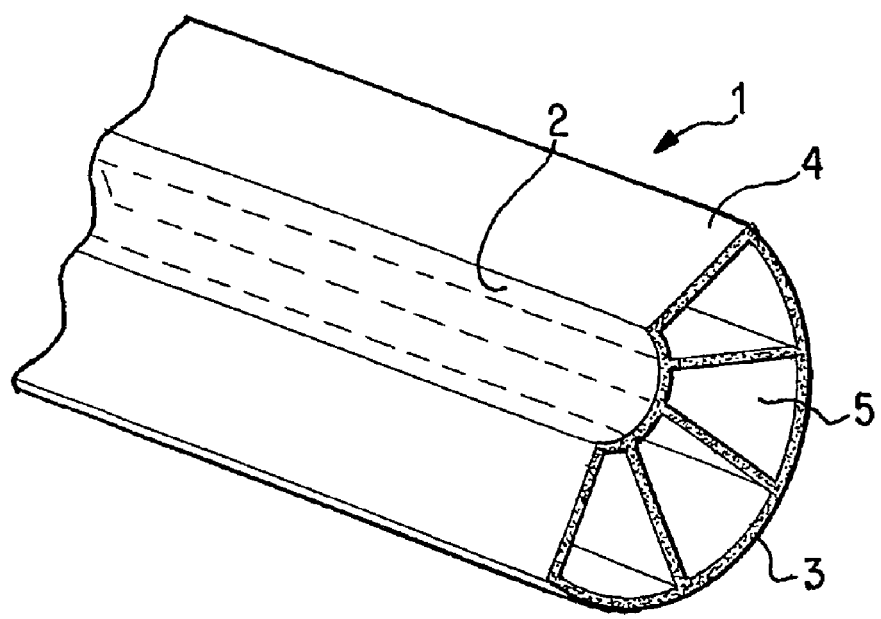
FIG. 4 is a perspective view of a second pipe insert embodiment according to the invention.
Figure 5:
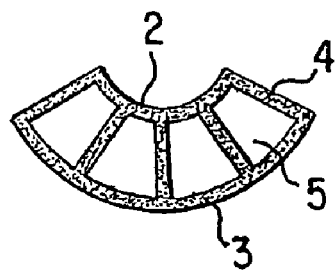
FIG. 5 is a cross-sectional view of the pipe insert of FIG. 4.
Figure 6:
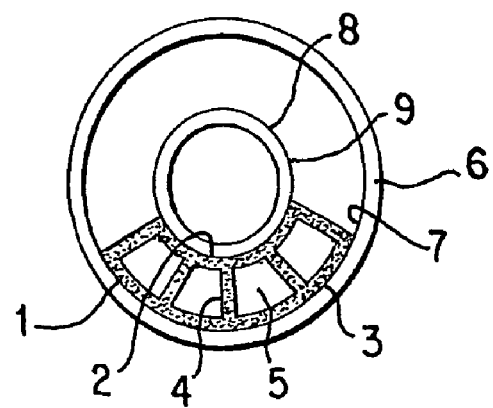
FIG. 6 is a cross-sectional view of a pipe assembly incorporating the pipe insert of FIGS. 4 and 5 inserted between outer and inner pipes.

FIGS. 4–6 illustrate an alternative embodiment of pipe insert and pipe assembly according to the invention. Parts corresponding to the parts of the embodiment of FIGS. 1–3 are designated by like reference numerals. The difference is that this pipe insert embodiment is provided with five radial walls 4 which form four elongated channels 5. In other respects, the embodiment of FIGS. 4–6 is the same as that shown in FIGS. 1–3. It will be appreciated by persons skilled in the art that the pipe insert of the invention can be formed with various numbers of radial walls 4 and consequent elongated channels 5.

Figure 7:
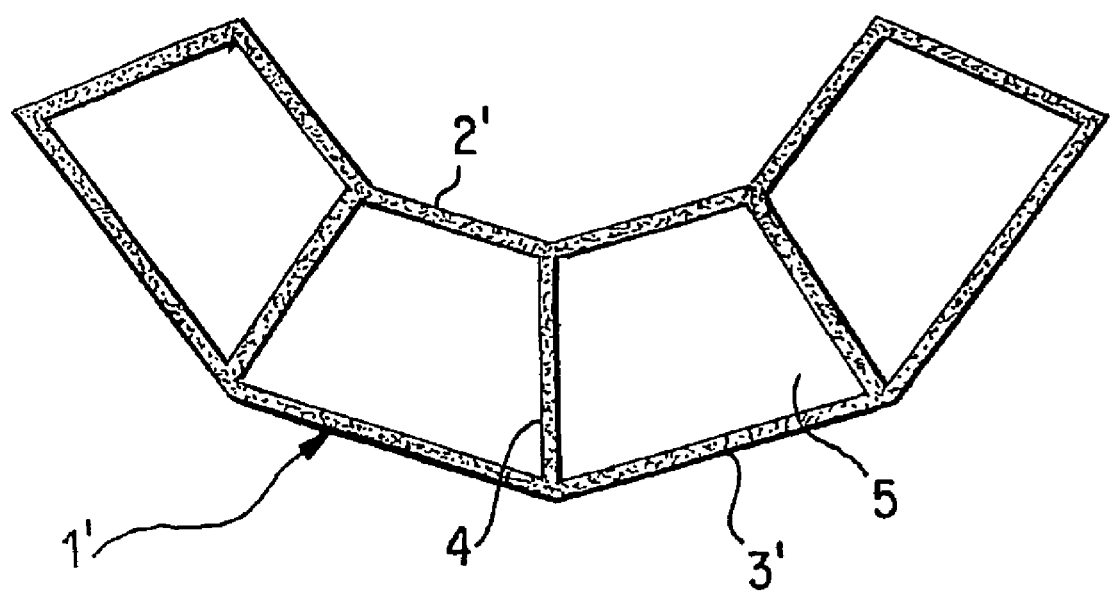
FIG. 7 shows an alternate embodiment of the pipe insert of the invention having a polygonal configuration.

Although it is desirable for the curvature of the pipe insert to be a smooth curve so that it will mate more or less tightly against a curved inner wall of a circular pipe in which it is inserted, this is not absolutely essential. If desired, the outer wall of the curved insert may, for example, comprise one or more flattened segments so that the insert could have a polygonal outer configuration as shown in the alternate embodiment depicted in FIG. 7. In a similar vein, the inner wall 2' may comprise a series of flattened segments forming a polygonal surface. Other than the polygonal configuration of the inner and outer walls 2' and 3', the insert of FIG. 7 corresponds to those of FIGS. 1 through 6.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims, and equivalents thereof.

What is claimed is:

1. An elongate, extruded, synthetic resin pipe insert having a carved cross section defining a segment of an annulus with coaxial, radially inner and outer walls and at least three radial walls extending between said radially inner and outer walls to form at least two elongated open channels, and a pipe member having an outer wall matching and matingly received against said radially inner wall, said elongated open channels extending the length of the pipe member.

2. A pipe insert according to claim 1, wherein said annulus is a segment of a circular ring, and said inner and outer walls are configured as smooth curves.

3. A pipe insert according to claim 1, wherein said curved inner and outer walls each comprise a succession of flattened segments which define a polygonal surface.

4. An elongate, extruded, synthetic resin pipe insert having a curved cross section defining a segment of an annulus with coaxial, radially inner and outer walls and at least three radial walls extending between said radially inner and outer walls to form at least two linear compartments, said annulus being a segment of a circular ring, and said inner and outer walls being configured as smooth curves, said insert further comprising a pipe member having a convexly curved outer wall matching the curvature of and matingly received against said curved, radially inner wall, wherein said pipe member is made of synthetic resin material and the outer wall of said pipe member is welded to said curved, radially inner wall.

5. A pipe insert according to claim 1, wherein said pipe insert is made of a synthetic resin material selected from the group consisting of polyvinyl chloride, chlorinated polyvinyl chloride, high density polypropylene, polypropylene, polyvinylidene fluoride and acrylonitrile-butadiene-styrene.

6. An elongate, extruded, synthetic resin pipe insert having a curved cross section defining a segment of an annulus with coaxial, radially inner and outer walls and at least three radial walls extending between said radially inner and outer walls to form at least two linear compartments, wherein said pipe insert is made of a synthetic resin material selected from the group consisting of polyvinyl chloride, chlorinated polyvinyl chloride, high density polypropylene, polypropylene, polyvinylidene fluoride and acrylonitrile-butadiene-styrene, and said synthetic resin material is fiberglass reinforced.

7. A pipe insert according to claim 2, wherein said curved cross section defines a circular arc of at least 60 degrees and less than 150 degrees.

8. A pipe insert according to claim 7, wherein said curved cross section defines a circular arc of from 90 degrees to 135 degrees.

9. A pipe assembly comprising an elongate pipe having a curved inner wall and a synthetic resin pipe insert defining elongated channels extending the length of the pipe and having a curved cross section defining a segment of an annulus with a radially inner wall and a convexly curved radially, outer wall received against the pipe inner wall.

10. A pipe assembly according to claim 9, wherein said pipe is a circular pipe and the radially outer wall of the pipe insert has a smoothly curved outer configuration matching the curvature of and matingly received against the pipe inner wall.

11. A pipe assembly according to claim 9, wherein the outer wall of said pipe insert comprises a succession of flattened segments which define a polygonal surface.

12. A pipe assembly according to claim 9, wherein said elongate pipe has a circular cross section.

13. A pipe assembly according to claim 10, wherein said elongate pipe is made of synthetic resin material, and said pipe insert is welded to the curved inner wall of said pipe.

14. A pipe assembly according to claim 10, wherein the radially inner wall of said pipe insert has a concavely curved configuration with a curvature coaxial to the curved said elongate pipe.

15. A pipe assembly according to claim 14, further comprising an inner pipe member having a convexly curved outer wall matching the curvature of and matingly received against said curved, radially inner wall of said pipe insert.

16. A pipe assembly according to claim 15, wherein said inner pipe member is made of synthetic resin material and is welded to said curved, radially inner wall.

17. A pipe assembly according to claim 9, wherein said pipe insert is made of a synthetic resin material selected from the group consisting of polyvinyl chloride, chlorinated polyvinyl chloride, high density polypropylene, polypropylene, polyvinylidene fluoride and acrylonitrile-butadiene-styrene.

18. A pipe assembly according to claim 17, wherein said synthetic resin material is fiberglass reinforced.

19. A pipe assembly according to claim 10, wherein said elongate pipe member is made of metal and said pipe insert is bonded by an adhesive to the curved inner wall of said pipe member.

20. A pipe assembly according to claim 10, wherein said curved cross section defines a circular arc of at least 60 degrees and less than 150 degrees.

21. A pipe insert according to claim 20, wherein said curved cross section defines a circular arc of from 90 degrees to 135 degrees.

* * * * *